(12) United States Patent
Friesen et al.

(10) Patent No.: US 8,481,207 B2
(45) Date of Patent: Jul. 9, 2013

(54) METAL-AIR ROOM-TEMPERATURE IONIC LIQUID ELECTROCHEMICAL CELL WITH LIQUID FUEL

(75) Inventors: Cody A. Friesen, Fort McDowell, AZ (US); Jose Antonio Bautista Martinez, Tempe, AZ (US); Robert Zeller, Scottsdale, AZ (US)

(73) Assignee: Arizona Board of Regents, Tempe, AZ (US)

( * ) Notice: Subject to any disclaimer, the term of this patent is extended or adjusted under 35 U.S.C. 154(b) by 264 days.

(21) Appl. No.: 13/096,851

(22) Filed: Apr. 28, 2011

(65) Prior Publication Data
US 2012/0009491 A1 Jan. 12, 2012

Related U.S. Application Data

(60) Provisional application No. 61/329,278, filed on Apr. 29, 2010.

(51) Int. Cl.
*H01M 10/02* (2006.01)

(52) U.S. Cl.
USPC .......................................... 429/209

(58) Field of Classification Search
None
See application file for complete search history.

(56) References Cited

U.S. PATENT DOCUMENTS

| | | | |
|---|---|---|---|
| 2005/0089738 A1* | 4/2005 | Tao et al. | 429/27 |
| 2008/0268387 A1* | 10/2008 | Saito et al. | 431/8 |
| 2009/0284229 A1* | 11/2009 | Friesen et al. | 320/137 |
| 2010/0285375 A1* | 11/2010 | Friesen et al. | 429/405 |
| 2011/0039181 A1* | 2/2011 | Friesen et al. | 429/456 |

* cited by examiner

*Primary Examiner* — Patrick Ryan
*Assistant Examiner* — Wyatt McConnell
(74) *Attorney, Agent, or Firm* — Pillsbury Winthrop Shaw Pittman LLP

(57) ABSTRACT

Provided in one embodiment is an electrochemical cell for generating power, and more particularly to a metal-air electrochemical cell using a low temperature ionic liquid and a liquid metal fuel.

12 Claims, 1 Drawing Sheet

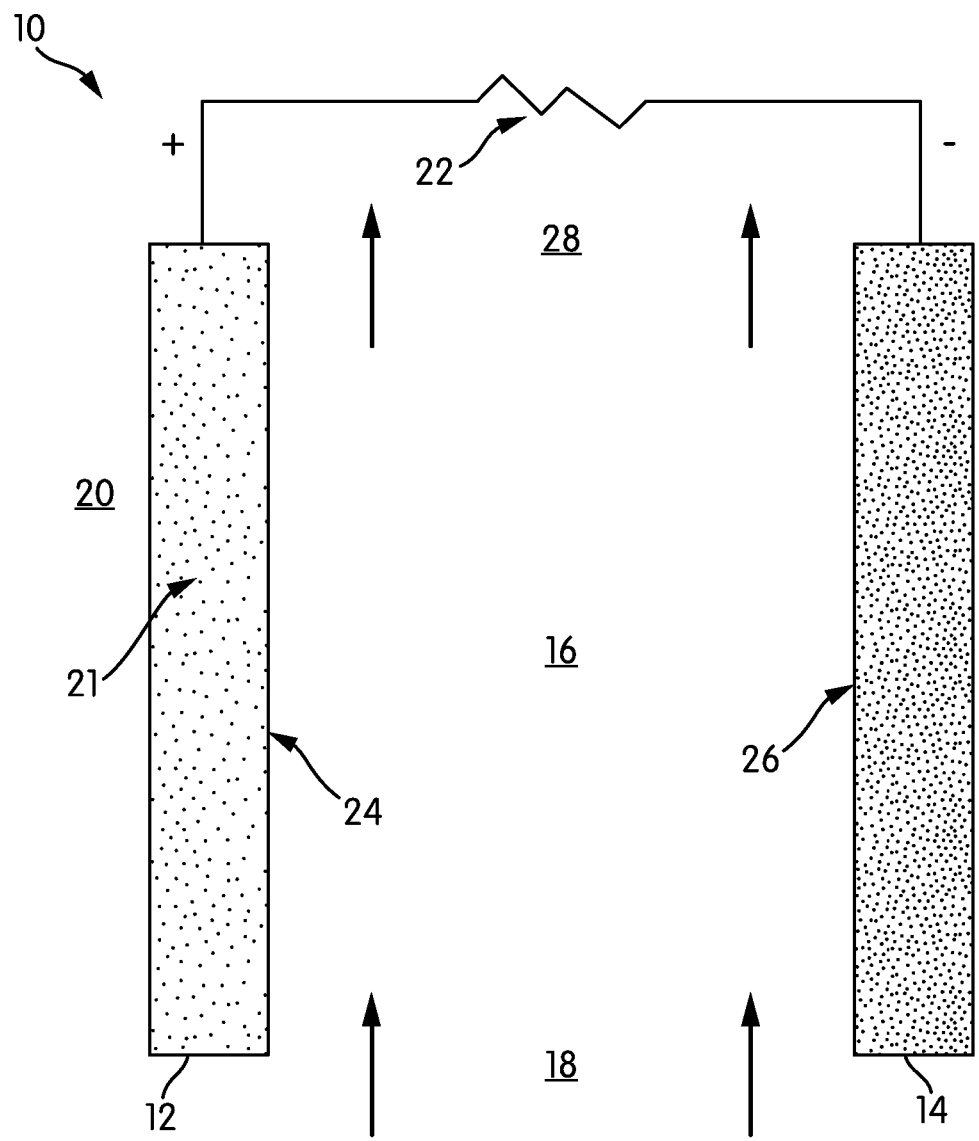

US 8,481,207 B2

METAL-AIR ROOM-TEMPERATURE IONIC LIQUID ELECTROCHEMICAL CELL WITH LIQUID FUEL

RELATED APPLICATION

This application claims priority from U.S. Provisional Application Ser. No. 61/329,278, filed Apr. 29, 2010, which is hereby incorporated by reference in its entirety.

FIELD OF THE INVENTION

The present invention is related to an electrochemical cell for generating power, and more particularly to a metal-air electrochemical cell using a low temperature ionic liquid and a liquid metal fuel.

BACKGROUND

A significant detriment to the energy density of most batteries is posed by the battery's cathode. This is true for battery chemistries using, for example, lithium or nickel. Typically, oxidant is stored at the cathode at a molar charge capacity that is two to five times lower than that of the anode. Many fuel cells, on the other hand, use oxygen from the air as a source of oxidant. The existence of a continuous and virtually limitless oxidant source enables, in principle, high energy density. However, the use of hydrogen and organic fuels precludes high energy efficiencies due to problems with vapor pressure and balance-of-systems complexity, such as humidification and membrane issues. Metal-air electrochemical cells are able to combine the ultra-high anode capacity of batteries with the air-breathing cathode of fuel cells in order to achieve substantial energy densities that are relevant to modern energy demands.

However, metal-air electrochemical cells experience problems with vapor pressure when the metal-air electrochemical cell employs an aqueous electrolyte or any other electrolytic solution with an electrolyte salt dissolved in a solvent. As the water content of an aqueous electrolyte diminishes upon evaporation, reaction rates at the electrodes decrease, and the volume of soluble products lessens, lowering energy capacity. Additionally, the metal fuel corrodes as the protons in the aqueous solution are reduced to form hydrogen gas. These problems may lead to eventual failure of the cell.

These problems have been addressed by using a low or room temperature ionic liquid rather than an aqueous electrolyte in a metal-air electrochemical cell, as described in U.S. Provisional Application Ser. Nos. 61/177,072, filed May 11, 2009, and 61/267,240, filed Dec. 7, 2009, both now converted as U.S. patent application Ser. No. 12/776,962, filed May 10, 2010. The use of a low or room temperature ionic liquid in the cell essentially eliminates the problems associated with evaporation of solvent from an electrolytic solution. Room temperature ionic liquids have extremely low vapor pressures (some have vapor pressures that are essentially immeasurable under standard conditions) and thus experience little or no evaporation. Therefore, cells using low or room temperature ionic liquids as their ionically conductive media need not incorporate excessive volumes of solution in order to compensate for evaporation over time. Relatively small amounts of ionic liquid are sufficient to support the electrochemical reactions needed for cell operation, thereby reducing cell weight and volume and increasing power to volume/weight ratios. Also, other problems associated with solvents, such as hydrogen evolution in an aqueous solution, may be avoided. This inventive development is not conceded to be prior art and merely is described for contextual purposes to facilitate an understanding of the further development described herein.

SUMMARY

Because a metal-air electrochemical cell using a low or room temperature ionic liquid can be designed to hold only small volumes, the distance between the electrodes can be quite narrow. However, decreased electrode spacing can become a limiting factor in the cell's rechargeability. Specifically, electrodeposition of solid fuels during recharge creates dendrites, which tend to grow from the fuel electrode toward the charging electrode (which may be the air electrode, if designed to be bi-functional, or a separate charging electrode). The closer the fuel electrode is to the charging electrode, the sooner the dendrites can bridge the electrodes and short them, ceasing the charging operation. To resolve this issue, the present invention electrodeposits a fuel that is absorbed into a porous electrode in liquid form. This obviates any dendrite formation, as liquid fuels do not form solid dendrites, and thus allows small spacing between fuel and charging electrodes without shorting during re-charging.

One aspect of the invention provides a rechargeable electrochemical cell for generating power. The cell comprises a porous fuel electrode for absorbing a low melting temperature metal fuel in liquid form and an air electrode for exposure to a source of gaseous oxidizer. The cell comprises a charging electrode selected from the group consisting of the air electrode and a third electrode. That is, the air electrode can be bi-functional and can also be the charging electrode, or it can be a separate electrode dedicated to charging. The electrodes are spaced apart from one another. An ionically conductive medium comprises a low temperature ionic liquid. The ionically conductive medium is contained between the electrodes for conducting ions to support the electrochemical reactions at the electrodes.

The cell is configured such that during discharging with the fuel and air electrodes coupled to a load (a) the fuel electrode oxidizes the metal fuel, and (b) the air electrode reduces the oxidizer. The cell is also configured such that, during charging with the fuel and charging electrodes coupled to a power source, to apply a charging potential difference therebetween, (a) metal ions of the low melting temperature metal fuel are reduced and electrodeposited onto the fuel electrode as the low melting temperature metal fuel for absorption in liquid form by the fuel electrode, and (b) the charging electrode oxidizes ions of the oxidizer.

Another aspect of the invention provides a method of operating a rechargeable electrochemical cell comprising:

discharging the cell with the fuel and air electrodes coupled to a load wherein (a) the fuel electrode oxidizes the low melting temperature metal fuel, and (b) the air electrode reduces the oxidizer, thus generating a discharging potential difference between the fuel and air electrodes; and charging the cell with the fuel and charging electrodes coupled to a power source to apply a charging potential difference therebetween wherein (a) metal ions of the low melting temperature metal fuel are reduced and electrodeposited onto the fuel electrode as the low melting temperature metal fuel for absorption in liquid form by the fuel electrode, and (b) the charging electrode oxidizes the ions of the oxidizer;

wherein at least during charging a temperature of at least the fuel electrode is maintained above a melting point of the low melting temperature metal fuel to enable the low melting temperature metal fuel electrodeposited onto the fuel electrode to be liquid for absorption therein.

Other objects, features, and advantages of the present invention will become apparent from the following detailed description, the accompanying drawings, and the appended claims.

BRIEF DESCRIPTION OF THE DRAWINGS

FIG. 1 is a schematic view of an embodiment of a metal-air ionic liquid electrochemical cell according to the present invention.

DETAILED DESCRIPTION OF THE ILLUSTRATED EMBODIMENTS

The FIGURE illustrates embodiments of various aspects of the invention claimed. These embodiments are in no way intended to be limiting, and are intended only as an example for facilitating and understanding of the principles of the claimed invention.

Reference may be made to U.S. Provisional Application Ser. Nos. 61/177,072, filed May 11, 2009 and 61/267,240 filed Dec. 7, 2009, for teachings concerning a metal-air electrochemical cell using a low temperature ionic liquid. Those applications are incorporated into the present application in their entirety. A brief overview of the construction and operation of a metal-air electrochemical cell using a low temperature ionic liquid will be provided first, and the specific embodiment using a liquid metal fuel described thereafter.

For the purposes of this application, a low temperature ionic liquid is defined as an ionic liquid having a melting point at or below 150° C. at 1 atm. These low temperature ionic liquids may also include the species known as room temperature ionic liquids, which are defined as ionic liquids having a melting point at or below 100° C. at 1 atm. Ionic liquids are also referred to as liquid salts. By definition, an ionic liquid is composed primarily of anions and cations of the salt. While an ionic liquid itself may be a solvent with respect to one or more other soluble products present in the ionic liquid, such as an additive or reactant by-product created by operation of the cell, an ionic liquid does not require the use of a solvent to dissolve the salt, as the liquid itself is "self-dissolving," i.e., it is a liquid of the electrolyte salt anions and cations by its own nature, and the use of a separate solvent to dissolve the salt is not needed.

However, even though low temperature or room temperature ionic liquids are defined by their respective melting points at 1 atm., in some embodiments the cell may be operated in an environment with a different pressure, and thus the melting point may vary with the operating pressure. Thus, reference to a melting point at 1 atm. is used as a reference point to define these liquids, and does not imply or restrict its actual use conditions in operation.

In some non-limiting embodiments, a substance that may be regarded in some contexts as a solvent may be added in relatively small amounts to the ionic liquid, either for enhancing the solubility of solutes in the ionic liquid, such as an additive added to or a by-product created in the ionic liquid by operation of the cell, or for providing a non-solvent functionality, such as the promotion of certain electrochemical reactions or transport of ions. Thus, the use of an ionic liquid does not entirely exclude the presence of a substance that may be regarded as solvent in other contexts, or act as a solvent with respect to solutes in the ionic liquid, but because a solvent is not needed to dissolve an ionic liquid, it can be used in a substantially smaller amount compared to conventional electrolyte salts requiring a bulk solvent for dissolution of the salt per se, such as aqueous electrolyte solutions. Indeed, in some non-limiting embodiments it is possible that no additive solvent is used.

In some non-limiting embodiments, the ionically conductive medium between the fuel and air electrodes may be a pure low temperature ionic liquid, i.e., it consists of the ionic liquid. In other non-limiting embodiments, it may consist essentially of the ionic liquid, meaning for the purposes of this application that it may include the ionic liquid and one or more other substances that do not materially affect its characteristic of being an ionic liquid. Thus, the term "consisting essentially of" an ionic liquid expressly encompasses the addition of one or more additives to enhance the ionic transport functionality of the ionic liquid, support the electrochemical reactions of the cell and/or enhance the solubility of solutes in the ionic liquid, but excludes the use of a bulk solvent required to dissolve the salt, such as is the case with aqueous electrolyte solutions. Of course, any presence of reaction by-products or ions in the ionic liquid would be permitted in either the embodiments consisting of the ionic liquid or the embodiments consisting essentially of the ionic liquid, as the very nature of the ionic liquid is to promote the transport and/or formation of such ions and/or by-products. The terms "solvent free" or "devoid of solvent" may be used to characterize the ionic liquid, and this terminology should be understood as (a) only excluding a bulk solvent that is provided for purposes of dissolving the ionic liquid, and not excluding the ionic liquid itself, which may act as a solvent with respect to another substance (e.g., an additive or the cell reaction by-products); and (b) not excluding the presence of one or more additives to enhance the ionic transport functionality of the ionic liquid, support the electrochemical reactions of the cell and/or enhance the solubility of solutes in the ionic liquid, even if such an additive theoretically could be regarded as a solvent in other contexts or with respect to solutes in the ionic liquid, but is not functioning for purposes of dissolution of the ionic liquid (for example, in some embodiments, water in the 10-100 ppm range may be used to promote the electrochemical reactions by increasing proton availability for supporting the oxygen reduction reaction, but the water is not functioning as a solvent with respect to the ionic liquid, although it may function as a solvent in other types of electrolytes, namely aqueous electrolytes).

FIG. 1 illustrates a low temperature ionic liquid electrochemical cell, generally indicated at 10. As illustrated and described below, the electrochemical cell 10 includes a plurality of electrodes including an air electrode 12 and a fuel electrode 14. In other embodiments, the air electrode 12 or the fuel electrode 14 of the electrochemical cell 10 may be provided by configurations other than a single electrode. Thus, the use of a single electrode as illustrated in FIG. 1 for each of the air electrode 12 and the fuel electrode 14 is not intended to be limiting. During discharge, the electrochemical cell 10 generates electricity by virtue of an oxidation half-reaction of a fuel at the fuel electrode 14 in parallel, that is, substantially at the same time, with a reduction half-reaction of an oxidizer 20 at the air electrode 12. The illustrated embodiment is not intended to be limiting in any way.

The overall cell configuration may, for example, be compacted, such as the wound or folded configuration shown in U.S. Provisional Application Ser. No. 61/267,240.

As shown in FIG. 1, and as discussed in further detail below, the air electrode 12 and the fuel electrode 14 are spaced to form a space or gap 16 therebetween. A low temperature ionic liquid, such as a room temperature ionic liquid, generally indicated at 18, may be contained in the gap 16 in contact with both the air electrode 12 and the fuel electrode 14. In some embodiments, the ionic liquid may flow along the gap 16. It should be understood that the electrochemical cell 10 may be oriented in any way, and the ionic liquid may flow in directions other than what is illustrated. Thus, any directional references are made with regard to the orientation as shown in FIG. 1, and are not intended to limit a working embodiment to any particular orientation. In other embodiments, the ionic liquid 18 may be static with no flow at all. The ionic liquid 18 may make contact with the air electrode 12 at an air electrode/IL interface 24. The ionic liquid 18 may make contact with the fuel electrode 14 at a fuel electrode/IL interface 26. In some embodiments, the ionic liquid 18 may only contact one electrode, such as the fuel electrode 14 and other ionically conductive material may interface with the ionic liquid and contact the other electrode(s).

As alluded to above, an oxidation half-reaction may take place at the fuel electrode 14 during discharge. In an embodiment, metal-fuel may be oxidized at the fuel electrode 14 to form oxidized metal-fuel ions and release electrons for conduction to an external circuit 22 (i.e., a load).

Also as alluded to above, a reduction half-reaction may take place at the air electrode 12. In an embodiment, an oxidizer 20 may be reduced through the reduction half-reaction at the air electrode 12. For non-limiting illustration purposes, the electrons from the fuel electrode 14 may flow to the external circuit 22 and return to the air electrode 12 to facilitate the reduction of the oxidizer 20. The oxidizer 20 is reduced on the air electrode 12 at oxidizer reduction reaction sites 21. In an embodiment, a catalyst is used to facilitate the oxidizer reduction half-reaction at the oxidizer reduction reaction sites 21. The air electrode 12 may include catalyst material, such as manganese oxide, nickel, pyrolized cobalt, activated carbon, silver, platinum, or any other catalyst material or mixture of materials with high oxygen reduction activity for catalyzing reduction of the oxidizer, which will be discussed below. In an embodiment, the air electrode 12 may be porous and the porous body with a high surface area may comprise the catalyst material.

In an embodiment, the air electrode 12 may be a passive or "breathing" air electrode 12 that is passively exposed, such as through windows or openings to an oxidizer source (typically oxygen present in ambient air) and absorbs the oxidizer 20 for consumption in the electrochemical cell 10 reactions. That is, the oxidizer 20 will permeate from the oxidizer source into the air electrode 12. Thus, the oxidizer 20 need not be actively pumped or otherwise directed to the air electrode 12, such as via an inlet. Any part of the air electrode 12 by which the oxidizer 20 is absorbed or otherwise permeates or contacts the air electrode 12 may be generically referred to as an "input." The term input may broadly encompass all ways of delivering oxidizer to the air electrode 12 for the oxidizer reduction half-reaction at the oxidizer reduction reaction sites 21 on the air electrode 12.

By means of a non-limiting illustration, the air electrode 12 may be a gas permeable electrode having an outer surface exposed to ambient air such that the oxidizer 20 comprises oxygen that permeates the air electrode 12. Similarly, the air electrode 12 may comprise a barrier membrane on the outer surface of the air electrode 12 that is gas permeable and liquid impermeable so as to permit permeation of the oxidizer 20 via the outer surface of the air electrode 12 and prevent the ionic liquid 18 from flowing through the outer surface of the air electrode 12. In an embodiment, the air electrode 12 may be a porous body covered on the inner side by a liquid permeable layer through which the ionic liquid 18 may pass so that the ionic liquid 18 may contact the porous body.

The ionic liquid may have a vapor pressure equal to or less than 1 mm Hg at 20° C. above the ionic liquid's melting point at 1 atm. More preferably, it has a vapor pressure equal to or less than 0.5 mm Hg or 0.1 mm Hg at 20° C. above the ionic liquid's melting point at 1 atm. Still more preferably, the ionic liquid has a vapor pressure that is essentially immeasurable at 20° C. above the ionic liquid's melting point at 1 atm., and thus is regarded as essentially zero. Because a low or immeasurable vapor pressure means little or no evaporation, an excessive amount of ionic liquid 16 need not be included in the cell or in a separate reservoir to compensate for excessive evaporation over time. Thus, in some embodiments a relatively small amount of ionic liquid—even just a minimal amount sufficient to support the electrochemical reactions—can be used in the cell, thus reducing its overall weight and volume and increasing its power to volume/weight ratios. Moreover, this ability to have a lower volume enables the cell to have a thinner profile, which enables it to be wound into or otherwise arranged in a compact configuration.

The ionic liquid's melting point plus 20° C. at 1 atm. is used as the reference point for the ionic liquid's vapor pressure as a matter of convenience. Generally, a cell's operating temperature is above the ionic liquid's melting point, but the actual operating temperature may be different or may fluctuate in some embodiments. Rather than choose a point of reference that may vary based on operating conditions, such as the operating temperature, the ionic liquid's melting point plus 20° C. at 1 atm. may be used as a stable and verifiable reference point. The fact that this is used as a reference point does not imply that the cell need necessarily be operated at that temperature, and the operating temperature may be any temperature at or above the ionic liquid's melting point.

The vapor pressure of the ionic liquid at the operating temperature (which may be within a range of operating temperatures) may also be used as the reference point as well. Thus, in some embodiments the cell operation method may be performed with the ionic liquid at a temperature at or above its melting point and at which the vapor pressure of the ionic liquid is less than or equal to the specified value. For example, the vapor pressure at the operating temperature may be at or below 1 mm Hg, 0.5 mm Hg, 0.1 mm Hg or immeasurable and essentially zero. Optionally, a heater, such as a controlled heater with temperature feedback, may be used to heat the cell and its ionic liquid to the operating temperature and maintain the temperature at a target temperature or within a target range. In some embodiments, no heater is needed, and the cell may be designed to operate at standard ambient conditions (or it may operate in a high temperature environment where a heater is unnecessary).

In some non-limiting embodiments, the space between the fuel and air electrodes is in the range of 10 microns to 300 microns. Preferably, it is in the range of 10 microns to 100 microns, or in the narrower range of 10 microns to 50 microns.

In some embodiments, the use of the ionic liquid enables the cell to have a relatively high ratio of combined electrode thickness to ionic liquid thickness (the same holds true for electrode volume to ionic liquid volume, as the area for both electrodes and the ionic liquid is the same). The ratio of combined electrode thickness to ionic liquid thickness may be in the range of 1:10 to 10:1, and more preferably is in the range of 1:1 to 10:1, or 2:1 to 10:1, or 4:1 to 10:1. The ratio may also be greater than or equal to 1:1, and the ratio may even be greater than or equal to 2:1, 4:1 or 10:1 in some embodiments, with no upper limit on the ratio.

In an embodiment, the gaseous oxidizer source is ambient air, and the oxidizer 20 is oxygen. In an embodiment, oxygen as the oxidizer 20 may be reduced at the air electrode 12 to form reduced oxygen ions. In an embodiment, the oxygen reduction half-reaction may be represented by the following equation:

$$O_2 + 4e^- \rightarrow 2O^{2-} \qquad (2)$$

In an embodiment, the oxygen may be reduced by the four electron process, described above, or by a single electron process to $O_2^-$ (superoxide), or by a two electron process to $O^-$ (peroxide), all of which may generically be referred to as oxides. For example, if some water content is present in the cell, the $O_2$ ions may reduce and combine with hydrogen to form $OH^-$ or water during discharge, and the $OH^-$ ions or water may be oxidized during recharge to evolve oxygen. Embodiments described herein are not intended to be limiting in any way.

In an embodiment, the oxygen may be supplied from an evolved oxygen recovery system used in a regenerative electrochemical cell. Other examples of electrochemical cells that may be useful embodiments of the invention herein are shown, for example, in U.S. patent application Ser. No. 12/549,617, filed on Aug. 28, 2009, which is incorporated herein by reference in its entirety.

As described above in non-limiting embodiments, the oxidation half-reaction and the reduction half-reaction generate oxidized metal fuel ions and electrons, and reduced oxygen ions, respectively. In an embodiment, the oxidized metal fuel ions (M) and the reduced oxygen ions (O) may combine in the cell to create metal oxide by-products ("$MO_x$") 28, as represented by the following equation:

$$(M) + (O) \rightarrow MO_x \qquad (3)$$

$MO_x$ represents a stoichiometric or non-stoichiometric oxide, and x describes the ratio of oxygen to metal in the oxide. In an embodiment, oxygen may be present as $O^{2-}$ (oxide), $O^-$ (peroxide) or $O_2^-$ (superoxide), and M may have different oxidation states depending on which metal fuel is combined with the oxidizer 20 and how fully oxidized the metal fuel is in the metal electrode 14 reaction.

Additional intermediary reactions may occur at the metal electrode 14 and/or the air electrode 12 and/or in the gap 16, and the described reactions are not intended to be exclusive of any side or intermediary reactions. Also, the reactions are representative and may be expressed differently, but the general overall reaction results in the oxidation of a metal-fuel and the reduction of a gaseous oxidizer, such as oxygen, to produce the metal-oxide by-product 28 and the electrical current that generates energy density for the electrochemical cell.

During re-charge, a potential difference from a power source is applied to the fuel electrode 14 and a charging electrode, which may be the air electrode 12 or a separate electrode used solely for charging. As a result of this potential difference, ions of the metal fuel are reduced and electrodeposited on the fuel electrode 14, and ions of the oxidizer are oxidized. Typically, the oxidizer is oxygen, and thus the oxidation evolves oxygen, which is off-gassed from the cell. The ions of the fuel and oxidizer may be derived from disassociation of the metal oxide formed in the cell 10 during discharge.

Other examples of electrochemical cells in which embodiments of the invention may be used are shown, for example, in U.S. Provisional Application Ser. No. 61/054,364, filed on May 19, 2008, U.S. Provisional Application Ser. No. 61/064,955, filed on Apr. 4, 2008, U.S. patent application Ser. No. 12/385,217, filed on Apr. 1, 2009, U.S. patent application Ser. No. 12/385,489, filed on Apr. 9, 2009, U.S. Provisional Application Ser. No. 61/243,970, filed Sep. 18, 2009, U.S. patent application Ser. No. 12/631,484, filed Dec. 4, 2009, U.S. Provisional Application Ser. No. 61/249,917, filed Oct. 8, 2009, U.S. Provisional Application Ser. No. 61/301,377, filed Feb. 4, 2010, which are incorporated herein by reference in their entireties.

Turning now to the specifics of use of the cell 10 with a liquid metal fuel, in one embodiment, the fuel may be a metal fuel that is in liquid form at least during charging, and the fuel electrode 14 may be a porous electrode that absorbs the liquid metal fuel. In this embodiment, the low or room temperature ionic liquid may comprise ions of the fuel. As an example, the metal fuel may be gallium, which has a melting point of 29.76° C. (85.58° F.) (standard conditions), and thus is liquid above that relatively low temperature. Other metal fuels may be used, such as a gallium alloy, mercury, sodium, potassium, cesium, rubidium, or eutectic alloys of gallium, indium, tin, and/or antimony, or any other metal that is liquid at a relatively low temperature, such as at or below 150° C. The term "low melting temperature metal" is thus used to refer to any metal having a melting point at or below 150° C. at 1 atm. As used herein, the term metal fuels is not limited to elemental metal, and may include alloys, metal hydrides or other forms comprising a metal. The ionic liquid may be made, for example, by mixing ImCl (imidazolium chloride) and $GaCl_3$ (gallium trichloride).

In equal proportions, this ionic liquid is known as a tetrachlorogallate melt, and may be described by the formula:

$$ImCl + GaCl_3 \rightarrow Im^+ + GaCl_4^-$$

Thus, the constituents are dissolved together, with the gallium cations supported by the chloride anions. The ionic liquid is non-aqueous and may consist or consist essentially of these dissolved constituents. In a proportion where twice as much gallium chloride is used, this ionic liquid is known as a heptachlorogallate melt, and may be described by the formula:

$$ImCl + 2GaCl_3 \rightarrow Im^+ + 2GaCl_7^-$$

Other proportions may also be used, and it is possible to have mixtures where the gallium ions are present in both the $GaCl_4^-$ and $2GaCl_7^-$ forms, such as may be the case where an intermediate amount of gallium chloride is used. The proportions are not intended to be limiting. In any case, the gallium ion ($Ga^{3+}$) is supported by 4 or 7 chloride ions ($Cl^-$), either or both of which may be referred to generally as a chlorogallate melt. Thus, the gallium ions may be described as being coordinated with the chloride ions within the ionic liquid.

Because gallium in its metallic form is liquid at relatively low temperatures, it may be absorbed by the porous fuel electrode 14 while liquid. This is advantageous for rechargeable cells, because liquid metals do not form dendrites, and thus dendritic shorting between the charging and fuel electrodes during re-charging is eliminated.

Also, the "wicking" effect provided by the interaction between the liquid fuel and the porous fuel electrode 14 may promote enhanced penetration depth of the liquid metal fuel into the fuel electrode 14 during charging. Wicking refers to the absorption of the liquid fuel into the porous body of the fuel electrode 14. Specifically, because the fuel is being electrodeposited in liquid form, the liquid may be absorbed or wicked into the fuel electrode 14's porous body, thus enabling more surface area at the fuel electrode/ionic liquid interface 26 to be exposed for continued electrodeposition. This advantage of the wicking effect may be present in some embodiments, and may be a function of the absorption rate, porosity, and other such factors, and is not intended to be limiting.

Preferably, the fuel electrode 14 has a continuous or essentially continuous matrix of pores within its body, with the pore matrix open to at least the surface contacting the ionic liquid. This facilitates absorption of the electrodeposited liquid metal fuel into the fuel electrode 14 body. Specifically, because the matrix of pores is continuous or essentially continuous, the pores are interconnected to permit the liquid metal fuel to be absorbed and penetrate more deeply into the fuel electrode 14's body.

In use, during discharging with the air and fuel electrodes 12, 14 coupled to a load (i.e., an external circuit 22), the fuel electrode 14 oxidizes the metal fuel and the air electrode 12 reduces the oxidizer. Thus, a potential difference is generated between the air and fuel electrodes 12, 14. Specifically, the fuel absorbed by the fuel electrode 14 is oxidized to provide ions of the metal fuel to the ionic liquid. Continuing with gallium as the example, the oxidation reaction at the fuel electrode 14 may be expressed as:

$$2Ga \rightarrow 2Ga^{3+} + 6e^-$$

And the reduction reaction at the air electrode 12, with oxygen as the oxidizer, may be expressed as:

$$3O_2 + 6e^- \rightarrow 3O^{2-}$$

The reduced oxygen ions may ultimately react with the gallium ions to form gallium(III) oxide ($Ga_2O_3$) as follows:

$$2Ga^{3+} + 3O^{2-} \rightarrow 5Ga_2O_3$$

A series of intermediary reactions may occur to support the transport and/or reaction of the gallium and oxygen ions, and need not be described herein. The gallium (III) oxide may preferably be stored in the ionic liquid or in the air electrode.

During charging, the fuel and charging electrodes are coupled to a power source to apply a potential difference therebetween. This results in the fuel electrode 14 reducing the ions of the fuel such that the fuel is electrodeposited on the fuel electrode, and is absorbed in liquid form by the fuel electrode 14. That is, continuing with the gallium fuel example, gallium ions in the ionic liquid are reduced to form liquid gallium, which is absorbed or "wicked" into the fuel electrode. Simultaneously, the charging electrode oxidizes the ions of the oxidizer disassociated from the metal oxide. With oxygen as the oxidizer, this generates oxygen gas, which may be off-gassed from the cell, such as through the air electrode 12 or via some other means, such as one or more off-gassing ports. As mentioned above, in some embodiments, the charging electrode may be a third electrode dedicated to the charging function, and in other embodiments the air electrode 12 may also serve this function and thus play the dual role of both reducing and oxidizing the oxidizer.

With gallium as the example, the gallium(III)oxide may disassociate as:

$$Ga_2O_3 \rightarrow 2Ga^{3+} + 3O^{2-}$$

A series of intermediary reactions may occur to support the transport and disassociation of the gallium and oxygen ions, and need not be described herein.

The fuel ion reduction reaction at the fuel electrode may be expressed as:

$$2Ga^{3+} + 6e^- \rightarrow 2Ga$$

And the reaction oxidizing the oxidizer ions at the air electrode, with oxygen as the oxidizer, may be expressed as:

$$3O^{2-} \rightarrow 3O_2 + 6e^-$$

Preferably, the supporting ions of the ionic liquid remain electrochemically stable over the range of potentials applied/generated during charging and discharging. That is, the supporting ions (i.e., the $Im^+$ and $Cl^-$ in the example provided) should be selected so that oxidation/reduction of the liquid metal, the oxidizer, and the metal oxide occur in preference to the supporting ions. Thus, the reaction of the metal fuel ions and the reduced oxidizer ions to form the metal oxide during discharging should occur in preference to the metal fuel ions and the reduced oxidizer ions reacting with the supporting ions of the ionic liquid. Similarly, during discharging, the metal fuel should be oxidized in preference to oxidation of any supporting ions at the fuel electrode 14, and the oxidizer should be reduced in preference to any supporting ions at the air electrode 12. And during re-charge, the metal fuel ions should be reduced in preference to any supporting ions at the fuel electrode 14, and the reduced oxidizer ions should be oxidized in preference to any supporting ions at the air electrode 12 (or a separate charging electrode).

Thus, this embodiment enables a metal fuel to be used, which is oxidized to ions supported in the ionic liquid and reduced and electrodeposited for absorption in its liquid form by the fuel electrode 14. This avoids the dendrite growth that can occur with solid metal fuels as they are electrodeposited, as the dendrite growth may cross over to the charging electrode and short the cell before its maximum fuel growth density has been achieved. In one embodiment, the step of charging can be substantially free of dendrite formation, such as completely free of dendrite formation.

It is possible to heat the cell, or just the fuel electrode, above the melting point for the fuel during charging only. For example, a resistive heater (not shown) may be used. This is because dendrite formation is primarily an issue only during charging, and the fuel can be oxidized from either its liquid or solid state during discharging. Thus, the cell 10 may comprise a heater for heating at least the fuel electrode 14 above a melting point of the metal fuel, at least during the charging, to enable the metal fuel to be liquid when electrodeposited onto the fuel electrode 14 for absorption therein. This heater may heat the entire cell as well. Indeed, the heater may be used to maintain the ionic liquid above its melting point, which may be higher than the fuel's melting point in some instances. When gallium is the fuel, the heater may heat the fuel electrode 14 or the entire cell 10 to above the melting point of gallium (noted above).

In some embodiments, the heater may be activated only during charging, and in other embodiments the heater may be used to continually maintain the temperature of the fuel electrode 14 or cell 10 above the fuel's melting point. The latter may be used in cells designed for frequent charging/discharging, as this would minimize any delay associated with heating the cell/fuel electrode. However, that approach is not intended to be limiting, and the former approach may also be used in cells designed for frequent charging/discharging, and the heater may also be activated only during charging. If the ionic liquid's melting point is greater than that of the fuel, it would be desirable to use the heater to continually maintain the ionic liquid above its melting point.

It is possible in some embodiments, particularly when the heater is only activated during charging, that the metal fuel may initially be electrodeposited in solid form and then melt into liquid form for absorption as the fuel electrode 14 heats up.

The fuel electrode may be formed of any porous material that absorbs or wicks the liquid metal, including but not limited to porous carbon scaffold activated carbon, porous vitreous carbon, porous polymeric scaffold, a polymeric structure, and carbon-polymer composites.

This example is not intended to be limiting, and other fuels, oxidizers, or ionic liquid formulations may be used.

The foregoing illustrated embodiments have been provided solely for illustrating the structural and functional principles of the present invention and are not intended to be limiting. For example, the present invention may be practiced using different protic or aprotic ionic liquids, electrodes, oxidizers, metal fuels or different overall structural configuration or materials. Thus, the present invention is intended to encompass all modifications, substitutions, alterations, and equivalents within the spirit and scope of the following appended claims.

All publications, patents, and patent applications cited in this Specification are hereby incorporated by reference in their entirety.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

What is claimed:

1. A rechargeable electrochemical cell for generating power, comprising:
    a porous fuel electrode for absorbing a low melting temperature metal fuel in liquid form;
    an air electrode for exposure to a source of gaseous oxidizer;
    a charging electrode selected from the group consisting of the air electrode and a third electrode;
    the electrodes being spaced apart from one another; and
    an ionically conductive medium comprising a low temperature ionic liquid, the ionically conductive medium being contained between the electrodes for conducting ions to support the electrochemical reactions at the electrodes;
    wherein the cell is configured such that during discharging with the fuel and air electrodes coupled to a load (a) the fuel electrode oxidizes the metal fuel, and (b) the air electrode reduces the oxidizer, thus generating a discharging potential difference between the fuel and air electrodes;
    wherein the cell is configured such that during charging with the fuel and charging electrodes coupled to a power source to apply a charging potential difference therebetween (a) metal ions of the low melting temperature metal fuel are reduced and electrodeposited onto the fuel electrode as the low melting temperature metal fuel for absorption in liquid form by the fuel electrode, and (b) the charging electrode oxidizes ions of the oxidizer.

2. The rechargeable electrochemical cell according to claim 1, further comprising a heater for heating at least the fuel electrode above a melting point of the low melting temperature metal fuel, at least during the charging, to enable the low melting temperature metal fuel to be liquid when electrodeposited onto the fuel electrode for absorption therein.

3. The rechargeable electrochemical cell according to claim 1, wherein the air electrode is configured to reduce gaseous oxygen during discharging and oxidize oxygen ions to evolve oxygen during recharging.

4. The rechargeable electrochemical cell according to claim 1, wherein the low melting temperature metal fuel comprises gallium.

5. The rechargeable electrochemical cell according to claim 4, wherein the low melting temperature metal fuel is elemental gallium.

6. The rechargeable electrochemical cell according to claim 1, wherein the ionic liquid contacts each of the electrodes.

7. A method for operating a rechargeable electrochemical cell for generating power, the electrochemical cell comprising: (i) a porous fuel electrode for absorbing a low melting temperature metal fuel in liquid form; (ii) an air electrode for exposure to a source of gaseous oxidizer; (iii) a charging electrode selected from the group consisting of the air electrode and a third electrode, the electrodes being spaced apart from one another; and (iv) an ionically conductive medium comprising a low temperature ionic liquid, the ionically conductive medium being contained between the electrodes for conducting ions to support the electrochemical reactions at the electrodes the method comprising:
    discharging the cell with the fuel and air electrodes coupled to a load wherein (a) the fuel electrode oxidizes the low melting temperature metal fuel, and (b) the air electrode reduces the oxidizer, thus generating a discharging potential difference between the fuel and air electrodes; and
    charging the cell with the fuel and charging electrodes coupled to a power source to apply a charging potential difference therebetween wherein (a) metal ions of the low melting temperature metal fuel are reduced and electrodeposited onto the fuel electrode as the low melting temperature metal fuel for absorption in liquid form by the fuel electrode, and (b) the charging electrode oxidizes the ions of the oxidizer;
    wherein during the charging a temperature of the fuel electrode is maintained above a melting point of the low melting temperature metal fuel to enable the low melting temperature metal fuel electrodeposited onto the fuel electrode to be liquid for absorption therein.

8. The method according to claim 7, wherein the air electrode reduces gaseous oxygen during discharging and oxidizes oxygen ions to evolve oxygen during the recharging.

9. The method according to claim 7, wherein the low melting temperature metal fuel comprises gallium.

10. The method according to claim 9, wherein the low temperature melting fuel is elemental gallium.

11. The method according to claim 7, wherein the ionic liquid contacts each of the electrodes.

12. The method according to claim 7, wherein the charging is substantially free of dendrite formation.

* * * * *